United States Patent [19]

Sandberg et al.

[11] 4,341,989
[45] Jul. 27, 1982

[54] DEVICE FOR PHASE COMPENSATION AND EXCITATION OF AN ASYNCHRONOUS MACHINE OPERATING AS A GENERATOR

[75] Inventors: Torvald Sandberg; Stig Forsberg, both of Luleå, Sweden

[73] Assignee: Elmekano i Luleå AB, Luleå, Sweden

[21] Appl. No.: 124,774

[22] Filed: Feb. 26, 1980

[30] Foreign Application Priority Data

Mar. 8, 1979 [SE] Sweden ................................. 7902102

[51] Int. Cl.³ .......................... H02P 9/30; H02P 9/00; H02K 11/00
[52] U.S. Cl. .................................. 322/95; 310/68 R; 361/434
[58] Field of Search .................. 322/20, 29, 90, 95, 322/96, 89; 361/433, 434; 310/68 R, 68 D

[56] References Cited

U.S. PATENT DOCUMENTS

| | | | |
|---|---|---|---|
| 2,881,376 | 4/1959 | Shaw | 322/20 |
| 3,245,888 | 4/1966 | West et al. | 361/434 |
| 3,270,254 | 8/1966 | Cohn | 361/434 |
| 3,378,755 | 4/1968 | Sawyer | 322/29 |
| 3,491,270 | 1/1970 | Gabriel et al. | 361/433 |

Primary Examiner—Robert J. Hickey
Attorney, Agent, or Firm—Burns, Doane, Swecker & Mathis

[57] ABSTRACT

The invention relates to a device for phase compensation and excitation of a multiphase asynchronous machine, especially one to be driven as a generator and to be operated at low speed. Each winding (1 to 3) in the machine is connected in series or in parallel with a capacitive element consisting of a bank of capacitors (4 to 6) having at least one pair of series connected electrolytic capacitors (7, 8), having in each pair equal terminals interconnected.

7 Claims, 5 Drawing Figures

DEVICE FOR PHASE COMPENSATION AND EXCITATION OF AN ASYNCHRONOUS MACHINE OPERATING AS A GENERATOR

This invention relates to a device for phase compensation and excitation of a multiphase asynchronous machine, according to the introductory portion of claim 1.

It is known that an asynchronous machine having a short-circuited rotor or a massive rotor with salient poles can be operated as a generator if a sufficiently large capacity is connected in series or in parallel with the phase windings. As is well-known the same applies to a synchronous generator, which can be operated without particular excitation if a sufficiently large capacitive load is connected to it.

The capacitors used to provide said capacity have always been of an A.C. type, and therefore they have been relatively large and expensive, especially for low frequencies and voltages.

Application fields for this compensation have been small hydro-electric generating stations, wind power generators, generators for battery charging, welding generators, frequency converters, etc.

An object of the present invention is to reduce the size of said capacitors and to make the banks of capacitors used cheaper.

This solution of this problem is given by way of the invention through the measures stated in the characterizing portion of the appended claim 1.

According to the invention at least one bank of capacitors formed by two D.C. capacitors connected in series, e.g. electrolytic capacitors having equal poles interconnected. For the excitation e.g. of a three-phase asynchronous generator six such capacitors are needed. Such banks of capacitors can be connected according to all known connection systems, i.e. in series, in parallel, in star connection or in delta connection. Technical or economical considerations will decide the choice of a suitable alternative.

Some embodiments are illustrated in the appended drawings.

Figure 1:
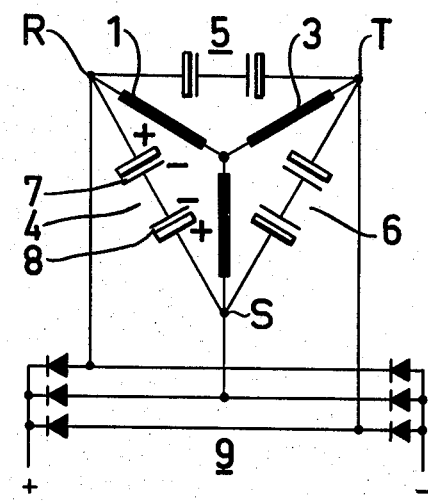
FIG. 1 shows a three-phase machine with star-connected phase windings and delta-connected banks of capacitors.

According to FIG. 1 a three-phase asynchronous generator has the phase terminals R, S and T and the star point of the star-connected phase windings 1, 2, 3 is designated by O. Delta-connected banks of capacitors 4, 5, 6 are connected between the phase terminals R, S, T. Each bank of capacitors consists of two D.C. capacitors, which are designated by 7, 8 in the bank of capacitors 4. These capacitors, which can be electrolytic capacitors, have equal terminals interconnected, in this case the negative terminals. This also applies to the banks of capacitors 5 and 6. The phase terminals are connected to a rectifier bridge 9 of a three-phase two-way type, from which direct current can be obtained.

Figure 2:
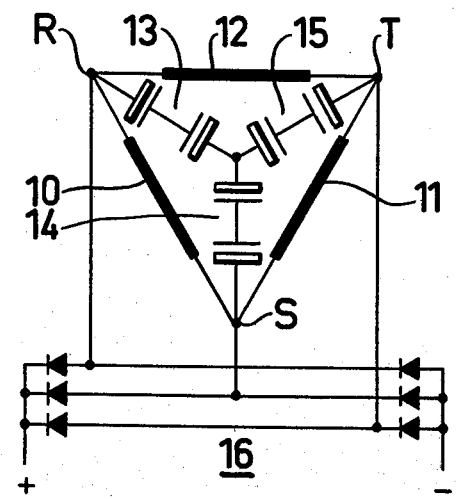
FIG. 2 shows a three-phase machine with delta-connected phase windings and star-connected banks of capacitors.

FIG. 2 shows a corresponding connection, in this case, however, the phase windings 10, 11, 12 are delta-connected and the banks of capacitors 13, 14 and 15 are star-connected between the phase terminals R, S, and T. The phase terminals are connected to a rectifier bridge 16 of the type shown in FIG. 1.

Figure 3:
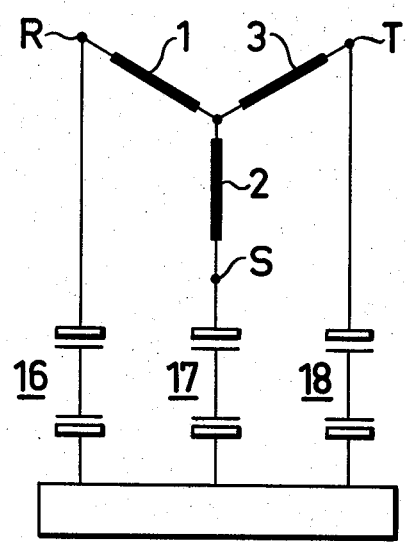
FIG. 3 shows a modification having star-connected phase windings and banks of capacitors connected in series.

FIG. 3 illustrates the modification that each one of the banks of capacitors 16, 17 and 18 is connected in series with one phase winding 1, 2, 3 and feeds a load 19 with alternating current.

Figure 4:
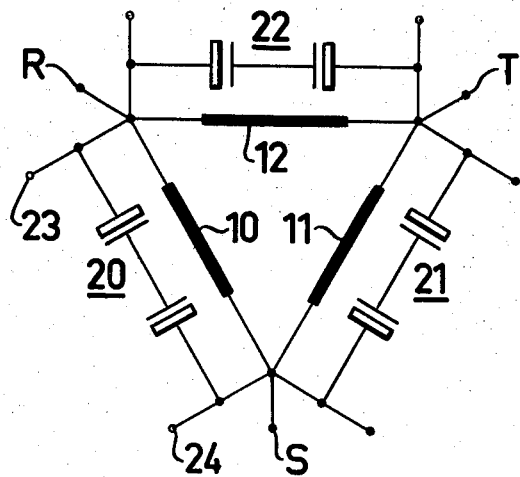
FIG. 4 shows a modification with delta-connected phase windings and banks os capacitors connected in series therewith.

In FIG. 4 an embodiment is shown, in which phase windings 10, 11 and 12 as well as banks of capacitors 20, 21, 22 are delta-connected with respect to the phase terminals R, S, T.

A.C. voltage can be obtained between the terminals of each bank of capacitors e.g. from the bank of capacitors 20, between the terminals 23 and 24. Similarily voltage can be obtained from the two other banks of capacitors. If desired, the phase voltage derived can be rectified, rectifiers for the different phases being connected in parallel on the D.C. side so that a D.C. generator is obtained.

Figure 5:
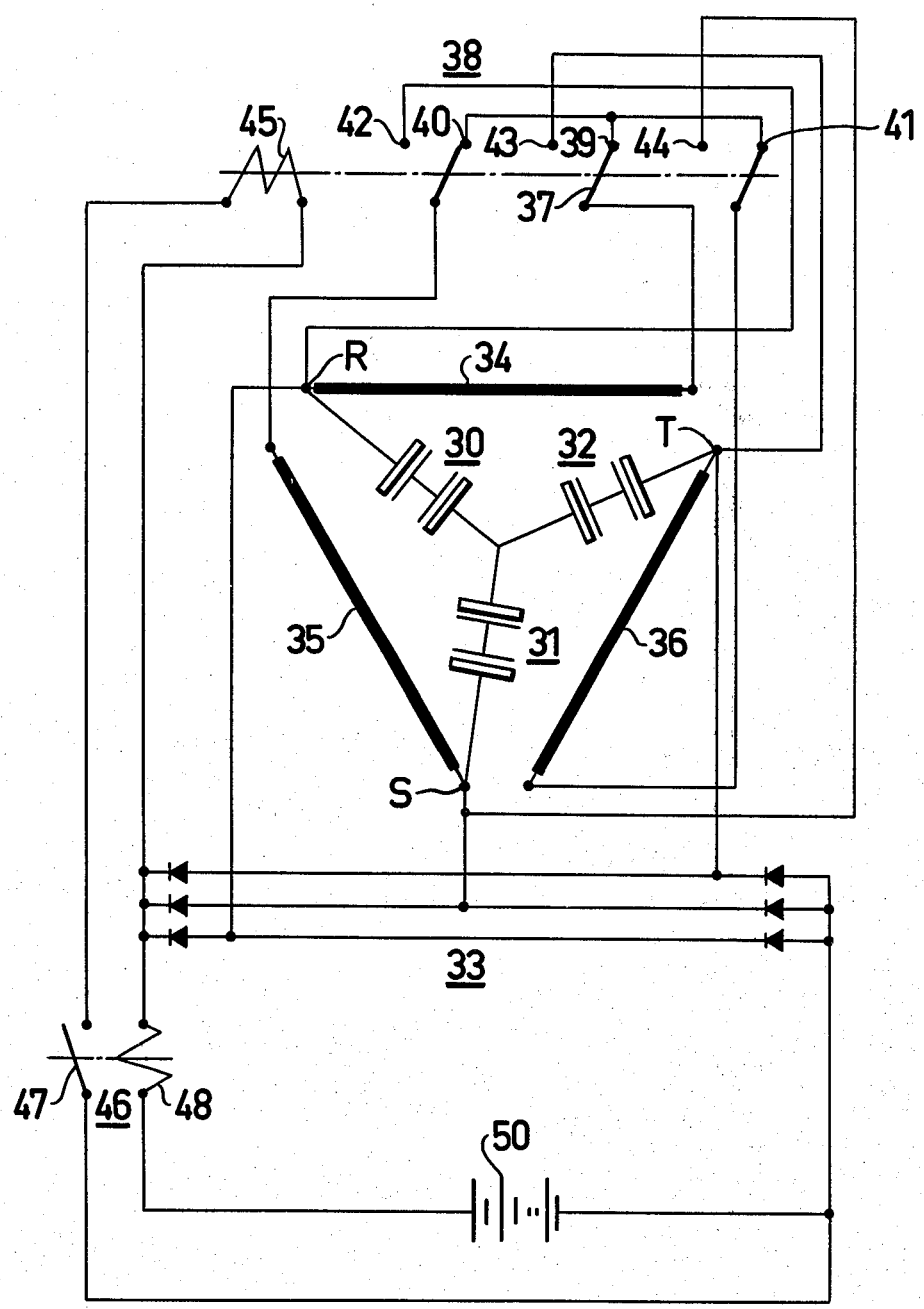
FIG. 5 shows an arrangement for switching between different connection systems for the windings.

FIG. 5 shows an embodiment, which for instance can be utilized for a wind power generator used for battery charging. Banks of capacitors 30, 31, and 32 are star-connected between phase terminals R, S, and T. Moreover, the phase terminals are connected to a rectifier bridge 33 of three-phase/two-way type. One end of a phase winding 34 is connected to the phase terminal R and the other end to a movable contact 37 in a double-throw three-pole contactor 38. This also applied to the phase windings 35 and 36 at the phase terminal S and T, respectively. In the contact position illustrated for the contactor 38 the stationary contact members 39, 40, 41, corresponding to one of the contact positions, are interconnected. The other stationary contact member 42, 43, 44 of each pole is each one connected to a phase terminal R, S, T. The trip coil 45 of the contactor 38 is fed via a contact 47 of a current relay 46. The relay coil 48 is connected in series with the battery 50 intended to be charged from the terminals of the rectifier bridge 33.

The operation of the device according to FIG. 5 is so chosen that the winding of the machine is maintained in star-connection at low speed, obtained with the illustrated contact position of the contact 38. When rated current has been reached in the phase windings the current relay 46 is energized and its contact closes the circuit through the trip coil 45, which is excited and changes over the contacts 37 to the other contact position and switches the phase windings to delta connection. The current can now be permitted to increase in the phase windings until a rated current has been achieved again.

What we claim is:

1. A device for phase compensation and excitation of a multiphase asynchronous machine with a short-circuited laminated rotor or a massive rotor with salient poles, during the operation of the machine as a generator, each winding being connected in series or in parallel with a capacitive element, characterized in that the capacitive element consists of a bank of capacitors (4 to 6) with at least one pair of series connected electrolytic capacitors (7, 8), having in each pair equal terminals interconnected.

2. The device of claim 1, characterized in that the banks of capacitors (4, 5, 6) are delta-connected between the phase terminals (R, S, T) of a machine having star-connected three-phase windings (1, 2, 3).

3. The device of claim 1, characterized in that the banks of capacitors (13, 14, 15) are star-connected between the phase terminals (R, S, T) of a machine having delta-connected three-phase windings (10, 11, 12).

4. The device of claim 1, characterized in that the banks of capacitors (16, 17, 18) are connected in series with the phase windings of a machine having start-connected three-phase windings (1, 2, 3).

5. The device of claim 1, characterized in that the banks of capacitors (20, 21, 22) are connected in parallel with the phase windings of a machine having delta-connected three-phase windings (10, 11, 12).

6. The device of one of claims 1 to 5, characterized in that it is provided with means (38, 46) for switching the phase windings (34 to 36) of the machine between a star connection and a delta connection simultaneously as the banks of capacitors (30 to 32) are star-connected between the phase terminals (R, S, T) of the machine.

7. The device of claim 6, characterized in that said switching is activated by means (46) which are actuated by the current or voltage provided by the machine.

* * * * *